(12) United States Patent
Meggiolan et al.

(10) Patent No.: US 11,685,467 B2
(45) Date of Patent: Jun. 27, 2023

(54) MOTORIZED HUB ASSEMBLY FOR A BICYCLE WHEEL

(71) Applicant: CAMPAGNOLO S.r.l., Vicenza (IT)

(72) Inventors: Mario Meggiolan, Creazzo (IT); Filippo Bove, Padua (IT)

(73) Assignee: CAMPAGNOLO S.r.l., Vicenza (IT)

( * ) Notice: Subject to any disclaimer, the term of this patent is extended or adjusted under 35 U.S.C. 154(b) by 59 days.

(21) Appl. No.: 17/403,354

(22) Filed: Aug. 16, 2021

(65) Prior Publication Data
US 2022/0055715 A1 Feb. 24, 2022

(30) Foreign Application Priority Data
Aug. 24, 2020 (IT) .................... 102020000020377

(51) Int. Cl.
| | |
|---|---|
| *B62M 6/65* | (2010.01) |
| *H02K 7/00* | (2006.01) |
| *H02K 7/08* | (2006.01) |
| *H02K 7/18* | (2006.01) |

(52) U.S. Cl.
CPC ............. *B62M 6/65* (2013.01); *H02K 7/003* (2013.01); *H02K 7/08* (2013.01); *H02K 7/1861* (2013.01)

(58) Field of Classification Search
CPC .......... B62M 6/65; H02K 7/003; H02K 7/08; H02K 7/1861

USPC ....................................................... 310/67 A
See application file for complete search history.

(56) References Cited

U.S. PATENT DOCUMENTS

2004/0079612 A1    4/2004 Endo

FOREIGN PATENT DOCUMENTS

| | | |
|---|---|---|
| CN | 1 367 116 A | 9/2002 |
| CN | 102 139 738 A | 8/2011 |
| DE | 10 2019 209 254 A1 | 1/2020 |
| JP | 2002 019684 A | 1/2002 |

OTHER PUBLICATIONS

Italian Search Report and Written Opinion in Italian Application No. 102020000020377, dated Apr. 23, 2021 with English translation.

*Primary Examiner* — Terrance L Kenerly
(74) *Attorney, Agent, or Firm* — Steinfl + Bruno LLP

(57) ABSTRACT

The present invention relates to a motorized hub assembly for a bicycle wheel. The assembly has a hub shaft extending along a longitudinal axis with a cavity to receive a quick release axle. A bearing having a radially inner ring is arranged radially outside the hub shaft. A hub body is rotatably mounted on the hub shaft about the longitudinal axis and an electric motor is arranged inside the hub body. A routing opening for passage of electrical conductors for the electric motor pass through a routing opening arranged radially between the inner ring of the bearing and the hub shaft.

15 Claims, 6 Drawing Sheets

MOTORIZED HUB ASSEMBLY FOR A BICYCLE WHEEL

CROSS REFERENCE TO RELATED APPLICATIONS

This application claims the benefit of Italian Application No. 102020000020377, filed on Aug. 24, 2020, which is incorporated herein by reference as if fully set forth.

FIELD OF INVENTION

The present invention relates to a motorized hub assembly for a bicycle wheel.

BACKGROUND

In modern bicycles there is increasing use of on-board equipment that facilitate the use of the bicycle. One type of such on-board equipment comprises an electric motor that assists or at least partially replaces the propulsive action exerted on the pedals of the bicycle by the user. Bicycles equipped with such on-board equipment are also known as pedal assist bicycles or electric bicycles.

The electric motor used is usually a DC electric motor with voltages usually comprised between 12 and 48 Volt that can be integrated in the hub of one of the wheels, most often in a rear one. In this case, the electric motor is arranged inside a hub body rotatably mounted on a hub shaft fixed with respect to the front fork (in the case of the hub of the front wheel) or with respect to the chain stay (in the case of the hub of the rear wheel) of the bicycle.

The activation at full power or at different power levels of the electric motor can be activated based on simple or even very articulated operating logics selected by the manufacturer of the electric motor, by the manufacturer of the bicycle or even by the user, just as such operating logics can be subjected to regulatory constraints of the country in which the bicycle is commercialized or used.

To this purpose, it is provided for the electric motor to be in electric connection with a control unit which comprises components and electronic circuits suitable for controlling the electric motor based on such operating logics. The control unit can be mounted directly on-board the electric motor or on-board the bicycle in a remote position from the electric motor. The control unit is very often arranged in electric connection with one or more sensors mounted on-board the bicycle, like for example pedaling sensors, force sensors, rotation sensors or other types of sensors, and with one or more control devices configured to send signals representative of parameters and/or values that are used by the control unit for the correct implementation of the activation logic of the electric motor to the control unit.

The electric energy necessary for powering the electric motor is stored in one or more accumulators of electric charge, like for example rechargeable lithium ion batteries, arranged in suitable housings connected to the frame or other parts of the bicycle or arranged inside the frame of the bicycle.

The Applicant has observed that in the case in which the electric motor is integrated in the hub of a wheel, making a motorized hub, it is necessary to ensure one or more electric connections between the electric motor, the control unit, the possible sensors and control devices and the battery.

The Applicant has observed that it is necessary for electrical conductor elements, such as power cables, signal cables and electrical connectors, to reach the electric motor and optionally the control unit housed inside the hub body.

The Applicant has verified that a passage groove is usually formed in the hub shaft, carved from the solid piece, at a bearing mounted on the hub shaft and active on the hub body that houses the electric motor. The electrical conductor elements pass in such a groove thus passing beneath the bearing and reach the inside of the hub body. The electrical conductor elements are substantially fixed with respect to the hub shaft and can be connected to the electric motor, to the control unit, to the possible sensors and control devices and to the battery.

The Applicant has noted that such a solution does not allow the use of hub shafts configured for the quick release of the wheel, in other words hub shafts that comprise an inner through cavity designed to be engaged by a quick release axle that constrains the hub shaft to the front fork or to the chain stay of the bicycle.

The Applicant has verified that such hub shafts have a wall thickness not sufficient to form a passage groove for the electrical conductor elements, since in many cases the thickness of the cylindrical wall defined by the hub shaft is less than the thickness of the electrical conductor elements.

The Applicant has noted that even if the thickness of the cylindrical wall of the hub shaft were sufficient to make a passage groove, such a passage groove could excessively weaken the structure of the hub shaft with possible compromises to the functional integrity of the hub shaft.

The Applicant has also verified that it is not possible to use the inner cavity of the hub shaft for the passage of the electrical conductor elements since such an inner cavity must be used to house the quick release axle.

The Applicant has hypothesized to groove the bearing and in particular the inner ring of the bearing to form the space necessary for the passage of the electrical conductor elements. The Applicant has, however, noted that this could compromise the correct functionality of the bearing.

The Applicant has noted that if it is wished to equip a motorized hub with a hub shaft configured for quick release, the passage of the electrical conductor elements must avoid having a negative impact on the correct operation of the hub to preserve the functional integrity of the hub itself.

SUMMARY

The Applicant has perceived that by providing a bearing of greater diameter than the diameter of the hub shaft, between the bearing and the hub shaft there would be a radial space able to be used for the passage of the electrical conductor elements without having to groove or perforate the hub shaft or the bearing.

BRIEF DESCRIPTION OF THE DRAWINGS

Further features and advantages of the present invention will become clearer from the following detailed description of preferred embodiments thereof, made with reference to the attached drawings that are provided for indicating features and not for limiting purposes. In such drawings.

DETAILED DESCRIPTION OF THE PREFERRED EMBODIMENTS

Figure 1:
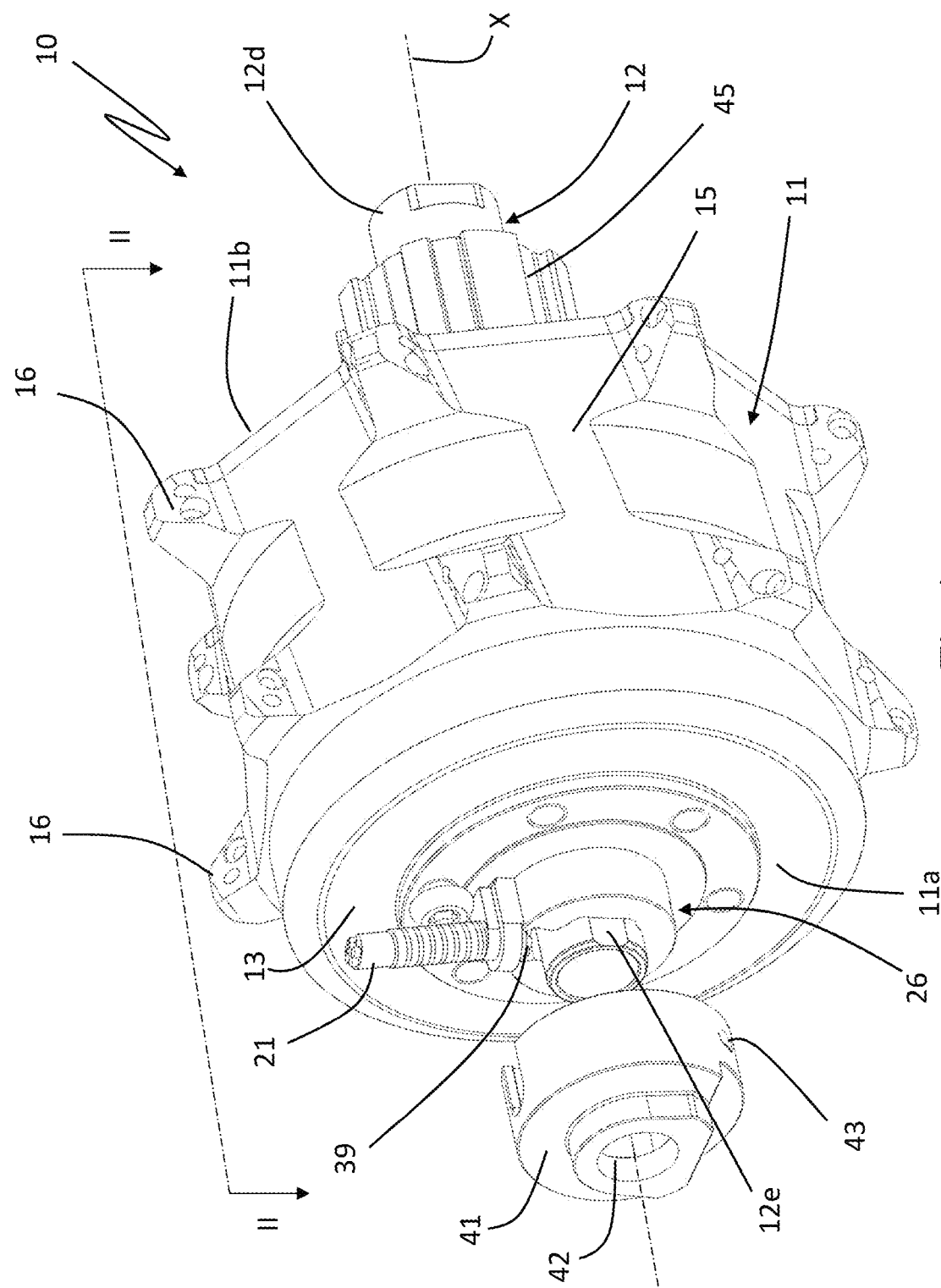
FIG. 1 is a perspective view of a motorized hub assembly of a bicycle wheel according to the present invention.

The present invention therefore relates to a motorized hub assembly for a bicycle wheel comprising:

a hub shaft extending along a longitudinal axis and comprising a longitudinal through cavity configured to receive a quick release axle;

at least one first bearing having a radially inner ring and arranged radially outside the hub shaft;

a hub body radially outside the hub shaft and rotatably mounted, about a rotation axis, on the hub shaft through said first bearing;

an electric motor arranged inside the hub body;

a routing opening crossed by electrical conductor elements connected to said electric motor, said routing opening being arranged radially between the inner ring of the first bearing and the hub shaft.

The hub shaft can be fixed with respect to the front fork (in the case of a hub of the front wheel) or with respect to the chain stay (in the case of a hub of the rear wheel) of the bicycle through the use of a quick release axle inserted in the longitudinal through cavity of the hub shaft.

The first bearing can be selected with a diameter of its inner ring such that the distance in the radial direction that separates the inner ring from the hub shaft is sufficient to form a routing opening crossed by the electrical conductor elements.

Between the inner ring of the first bearing and the hub shaft, in the areas not engaged by the routing opening it is possible to provide any spacer body or support body that allows the inner ring to be connected to the hub shaft, therefore allowing a correct rotary coupling between hub shaft and hub body.

The rotation axis of the hub body is taken as reference for the elements that form part of the motorized hub assembly of the present invention; the indications of direction and similar, such as "axial", "radial" and "circumferential" will refer to this axis. The indications "outwards" and "inwards" referring to radial directions must be interpreted as away from the rotation axis or towards the rotation axis. The axial direction is parallel to the direction of the rotation axis and the indications "inwards" and "outwards" referring to axial directions must be interpreted, respectively, as towards a radial reference plane passing through a middle point of the hub body and as away from such a reference plane. The circumferential direction is meant to indicate an arched direction, and not necessarily perfectly circular, around the rotation axis.

Preferably, a support body is provided at least at the routing opening and radially interposed between the inner ring of the first bearing and the routing opening; said support body being configured to withstand a thrust directed in the radially inner direction exerted by the first bearing and said inner ring of the first bearing resting on said support body.

The Applicant has noted that the first bearing transfers radial thrusts from the hub body to the hub shaft, transferring the stresses to which the rim of the wheel is subjected to the hub shaft and thus to the frame of the bicycle.

The Applicant has perceived that the routing opening provided between the first bearing and the hub shaft would prevent placing the first bearing in continuous circumferential contact with the hub shaft, causing a discontinuous support of the first bearing on the hub shaft at least at the routing opening.

The Applicant deems that such discontinuous support does not allow the first bearing to transfer radial thrusts coming from the hub body to the hub shaft in an identical manner along the entire circumferential extension thereof.

By providing a support body for the first bearing at least at the routing opening and configuring such a support body to withstand a thrust directed in a radially inner direction exerted by the first bearing, the circumferential continuity between the first bearing and the hub shaft is restored.

Preferably, said support body extends circumferentially around the entire hub shaft, said inner ring of the first bearing resting on said support body along the entire circumferential extension of the support body.

In this way, the support body allows the first bearing to rest uniformly along the entire inner ring, allowing the radial thrusts transferred to the first bearing to be distributed substantially uniformly on the inner ring.

Preferably, said support body has a radially outer resting surface for said inner ring of the first bearing, said radially outer resting surface being continuous.

Preferably, there are no interruptions or holes between any two points of the radially outer surface of the support body.

Preferably, an annular sealing gasket is provided axially outside the first bearing.

Preferably, said sealing gasket rests on said support body and is active between said support body and said hub body.

In this way, the sealing gasket prevents foreign bodies, water, mud or dirt from being able to reach the first bearing or being able to penetrate between the support body and the hub body.

Preferably, said support body comprises a radial passage axially outside said first bearing and defining a radial outlet for said routing opening; said electrical conductor elements crossing said radial passage.

The radial passage allows the electrical conductor elements to move away from the hub assembly in the radial direction or to create an electrical connection interface that can be engaged radially. In this way, the axial bulk of the hub assembly is not influenced by the presence of the electrical conductor elements.

In alternative embodiments, the support body can comprise an axial passage arranged outside said first bearing and defining an axial outlet for said routing opening; said electrical conductor elements crossing said axial passage.

Preferably, a cover is provided arranged at an axial end of the hub shaft; said cover axially closing said routing opening and being fixedly connected to said hub shaft.

The cover is preferably equipped with an axial through hole coaxial with the longitudinal through cavity of the hub shaft and is preferably configured to abut on the fork or on the chain stay of the bicycle.

Preferably, the cover is configured to cooperate with the quick release axle to constrain the hub shaft to the fork or to the chain stay of the bicycle.

Preferably, the radial passage of the support body is axially interposed between the cover and the first bearing.

Preferably, said support body has a delimiting wall for said routing opening; said routing opening being radially defined between said delimiting wall and said hub shaft.

The delimiting wall defines the width in the radial direction of the routing opening. The routing opening crossed by the electrical conductor elements extends between the delimiting wall and the hub shaft. A radially inner surface of the delimiting wall preferably directly faces the routing opening. A radially outer surface of the delimiting wall preferably defines at least one portion of the radially outer resting surface of the support body.

In a first embodiment, said support body preferably comprises a radially inner surface comprising a first portion and a second portion. Such a first portion is preferably radially spaced from said hub shaft and defines the radially inner surface of the delimiting wall. The second portion is preferably directly coupled with the hub shaft.

Preferably, said radially inner surface of the support body comprises two circumferentially spaced joining portions arranged between the first and the second portion, said routing opening being circumferentially delimited by said two joining portions.

The two joining portions define respective side walls that circumferentially limit the routing opening.

In the first embodiment, the routing opening is therefore preferably defined between the two joining portions of the radially inner surface of the support body, the delimiting wall of the support body and the hub shaft.

In a second embodiment, said support body comprises a substantially cylindrical radially inner surface spaced from said hub shaft.

Preferably, the radially inner surface comprises the radially inner surface of the delimiting wall.

In the second embodiment, said radially inner surface of the support body preferably comprises a coupling surface of the support body arranged in contact with a spacer body fixedly connected to the hub shaft.

The spacer body comprises a circumferential first end wall and a second circumferential end wall and extends around the hub shaft between said first and second circumferential end wall.

The routing opening is circumferentially delimited by said first and second circumferential end wall.

In the second embodiment, the routing opening is therefore preferably defined between the two end walls of the spacer, the delimiting wall of the support body and the hub shaft.

Preferably, the coupling surface of the support body comprises a threading to screw said support body onto a radially outer threaded surface of the spacer.

Preferably, the spacer is made from at least one portion of a stator of said electric motor. Such a stator portion can project axially from the hub body so as to be engaged by a cover or by another body configured to couple the hub shaft with the fork or with the chain stay of the bicycle.

Preferably, a second bearing having a radially inner ring is provided, said second bearing being arranged radially outside the hub shaft and rotatably coupling said hub shaft with said hub body.

The second bearing is preferably axially opposite the first bearing.

The inner ring of the second bearing preferably has a smaller diameter than the diameter of the inner ring of the first bearing, so that the inner ring of the second bearing can be directly in contact with the hub shaft.

With reference now to the attached figures, a motorized hub assembly of a bicycle wheel in accordance with the present invention is indicated as a whole with reference numeral 10.

The hub assembly 10 is configured to be mounted in a front or rear wheel of a bicycle; the example embodiment of FIG. 1 is specifically configured to be mounted in a rear wheel.

The hub assembly 10 comprises a hub body 11 rotatably mounted around a rotation axis X on a hub shaft 12.

The hub body 11 has a substantially cylindrical shape and comprises two opposite axial ends 11a, 11b. At each axial end 11a, 11b a respective closing plate 13, 14 of the hub body 11 is provided so that the hub body 11 makes an internally hollow body.

Figure 2:
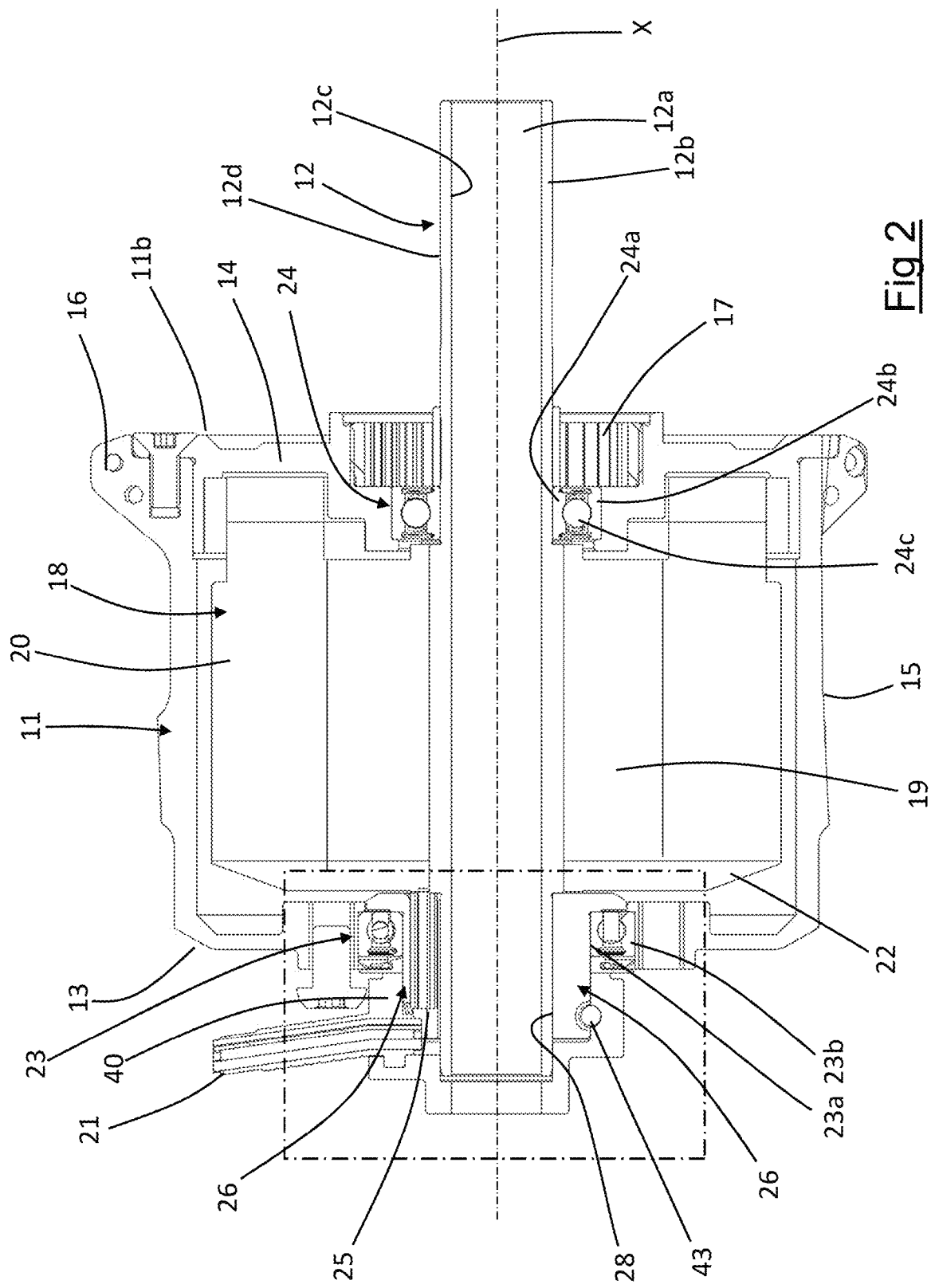
FIG. 2 is a section view according to the plane II-II of the hub assembly of FIG. 1.

In the preferred embodiment of the invention, a closing plate 13 is in one piece with the hub body 11 and the other closing plate 14 is removably mounted on the hub body 11 preferably through suitable bolts, as outlined in FIG. 2.

The hub body 11 can be made of a metallic material, for example aluminum or alloys thereof.

On a radially outer surface 15 of the hub body 11, or on one or both of the closing plates 13, 14, spoke attachment flanges 16 are provided. The flanges 16 can be made in one piece with the hub body 11 or can be made as distinct pieces from the hub body 11 to then be stably associated with the hub body 11.

A brake disc (not illustrated) can be mounted on the hub assembly 10 in axially outer position with respect to the spoke attachment flanges 16, preferably on a suitable mounting portion (not illustrated).

In the case in which the hub assembly is configured to be mounted on a rear wheel, the hub body 10 can be associated with a free wheel 45 (FIG. 1) for supporting a cogset of the rear gearshift of the bicycle. The free wheel 45 is mounted fixedly connected to the hub body 10 through a receiving seat 17 arranged at the axial end 11b of the hub body and preferably formed in the closing plate 14, as schematically illustrated in FIG. 2. The free wheel, when provided, is rotatably mounted on the hub shaft 12.

The hub shaft 12 can be constrained to the fork or to the chain stay of a bicycle and does not rotate with respect to the frame of the bicycle.

To this purpose, the hub shaft 12 extends along a longitudinal axis and comprises a longitudinal through cavity 12a configured to receive a quick release axle. The quick release axle (not illustrated) typically comprises a rod having, at one of the opposite axial end portions thereof, an outer threading intended to be coupled with an outer threading made on a cap configured to axially abut against an outer wall of an arm of the fork or of the chain stay. At the opposite axial end portion, the rod comprises a locking lever rotating as a unit with the rod and pivoted to the rod through a cam mechanism. The locking lever is also in abutment against an abutment surface provided in the rod and intended to abut with the other arm of the fork or of the chain stay of the bicycle. The screwing of the rod into the cap results in the locking of the rod with respect to the arm of the fork or of the chain stay. The subsequent rotation of the locking lever causes, thanks to the cam mechanism, the forced axial abutment of the abutment surface against the other arm of the fork or of the chain stay and, consequently, the locking of the hub shaft on the fork or on the chain stay.

The rod of the quick release axle is slidably received inside the longitudinal through cavity 12a of the hub shaft 12. The longitudinal through cavity 12a of the hub shaft 12 is defined by a cylindrical wall 12b of the hub shaft 12 having an inner surface 12c directly facing the inner cavity 12a and an outer surface 12d. The thickness of the cylindrical wall 12b, in other words the distance in the radial direction between the inner surface 12c and the outer surface 12d is preferably comprised between 0.5 millimeters and 3 millimeters, more preferably comprised between 0.75 and 1 millimeters.

Inside the hub body 11 an electric motor 18 is housed. The electric motor 18 is preferably a DC electric motor with power supply voltages comprised between 12 and 48 Volt. The electric motor 18 comprises a stator 19 and a rotor 20, outlined in FIG. 2. The stator 19 is fixedly connected to the hub shaft 12 and the rotor 20 is fixedly connected to the hub body 11. By supplying electrical energy to the electric motor 18, the rotor 20 is set in rotation with respect to the stator 19, making the hub body 11 rotate.

In order to allow the electric motor 18 to be in electric connection with one or more electric accumulators, electrical conductor elements 21 are provided connected to the electric motor 18. Such electrical connector elements 21 can also connect a control unit 22, for example an electronic board, to one or more sensors and to one or more control devices. The control unit 22 is configured to actuate the electric motor 18 according to one or more predetermined operating logics preferably able to be set by a user through one or more control devices. The control unit 22 is mounted inside the hub body 11 and is in electric connection with the electric motor 18 to allow it to be driven.

The electrical conductor elements 21 can be electric power cables and possibly signal cables, for example made of metal and coated with an electrically insulating sheath, or they can be one or more electrical connectors configured to mechanically and electrically couple with other electrical connectors coming from the frame of the bicycle. The electrical conductor elements 21 can also be electric cables coupled on one side with the electric motor and on the opposite side with one or more electrical connectors.

Figure 3:
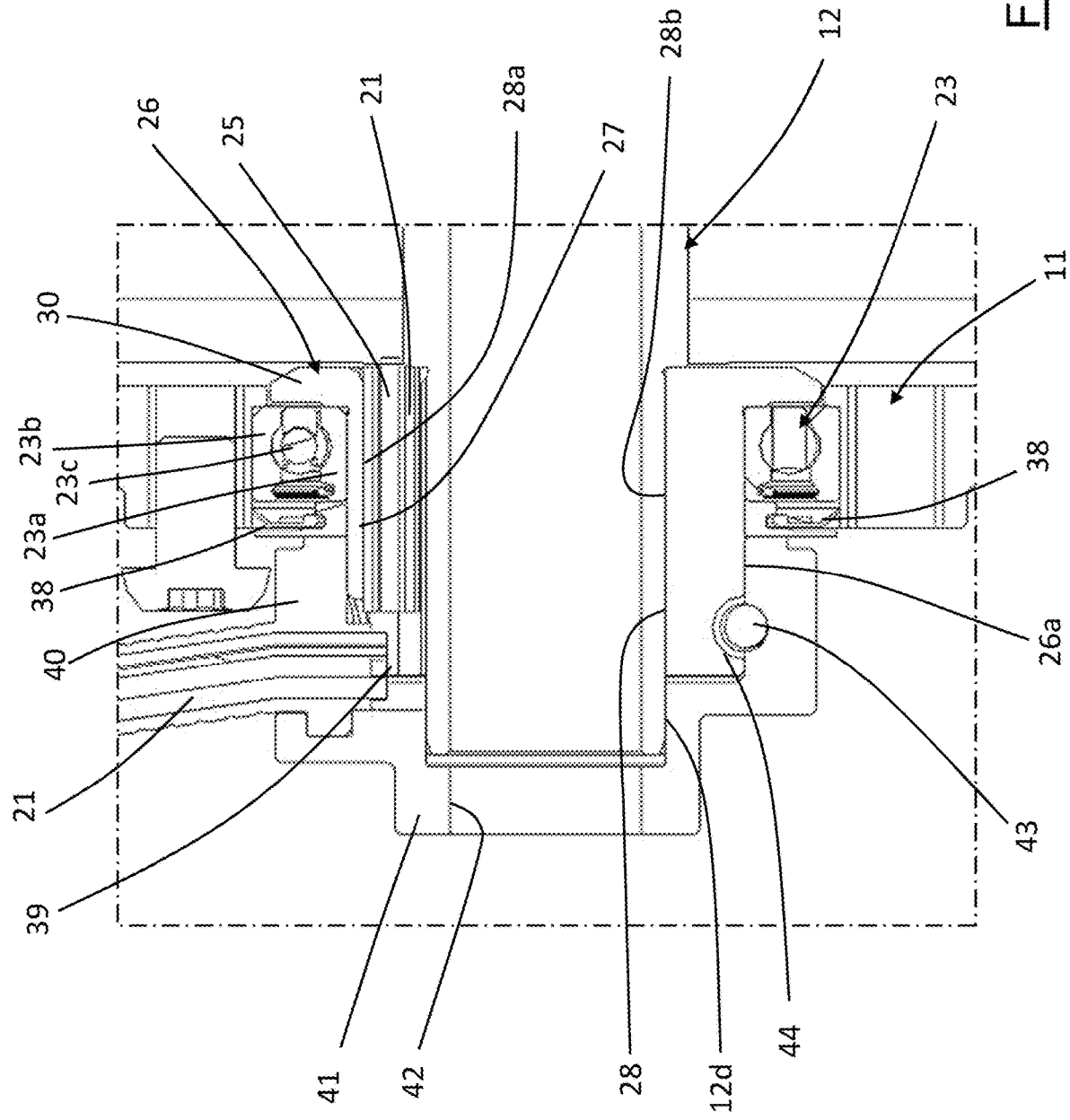
FIG. 3 is an enlarged view of the detail outlined in FIG. 2.
Figure 4:
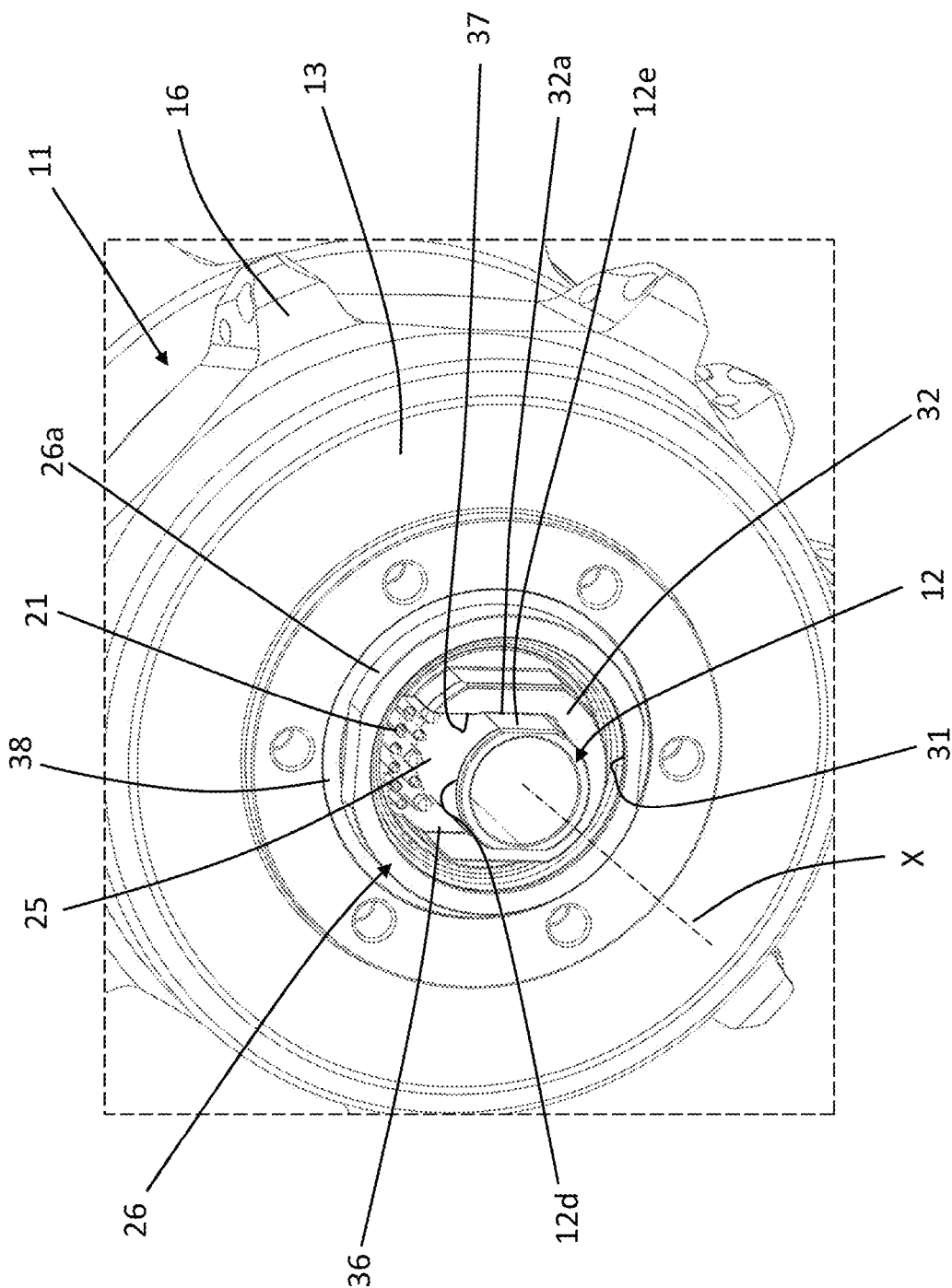
FIG. 4 is a partial perspective view of a further embodiment of a motorized hub assembly of a bicycle wheel according to the present invention.
Figure 5:
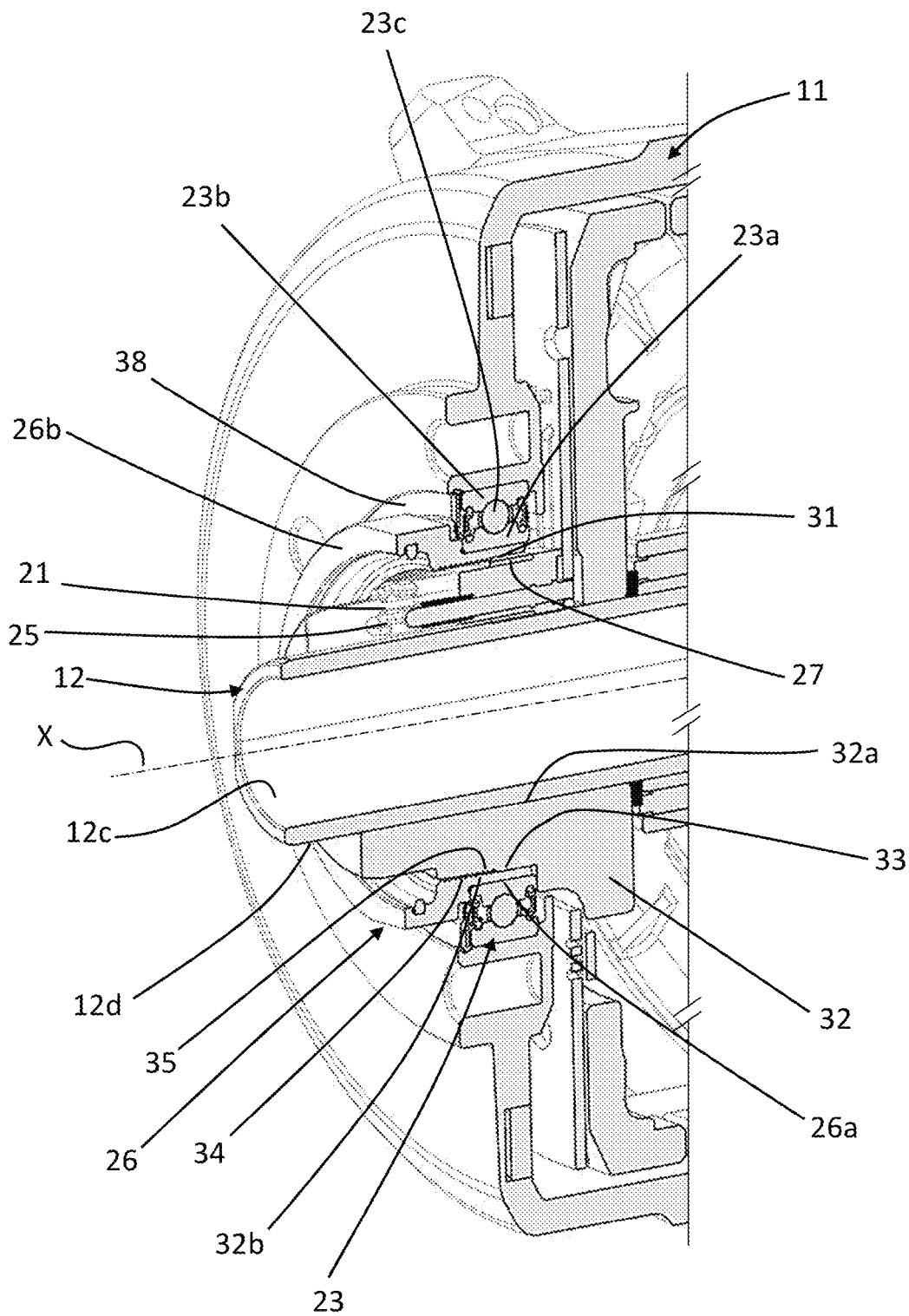
FIG. 5 is a section view of the motorized hub assembly of FIG. 4.

In the example embodiment illustrated in FIGS. 1, 2 and 3, the electrical conductor elements 21 are made from metallic cables coated with electrically insulating sheaths, whereas in the example embodiment illustrated in FIGS. 4 and 5 the electrical conductor elements 21 are made from connectors.

The electrical conductor elements 21 do not rotate with the hub body 11.

In order to allow the hub body 11 to rotate around the rotation axis X with respect to the hub shaft 12, a first bearing 23 and a second bearing 24 are provided that are coaxial and active between the hub shaft 12 and the hub body 11. The first 23 and the second bearing 24 are preferably rolling ball bearings of the radial type, in other words of the type in which the load force to be borne is substantially perpendicular to the rotation axis of the bearing (which coincides with the rotation axis X of the hub body 11).

The second bearing 24 is preferably arranged close to the axial end 11b of the hub body 11 carrying the closing plate 14 mounted on the hub body 11. The first bearing 23 is preferably arranged close to the other axial end 11a of the hub body 11.

The second bearing 24 is preferably directly coupled with the hub shaft 12. As shown in FIG. 2, the second bearing 24 comprises an inner ring 24a and an outer ring 24b and a plurality of balls 24c radially interposed between the inner ring 24a and the outer ring 24b, so as to make the outer ring 24b rotatable with respect to the inner ring 24a. The inner ring 24a preferably directly rests on the outer surface 12d of the hub shaft 12. The outer ring 12b is inserted into a seat formed in the hub body 11.

The first bearing 23 comprises an inner ring 23a and an outer ring 23b and a plurality of balls 23c radially interposed between the inner ring 23a and the outer ring 23b, so as to make the outer ring 23b rotatable with respect to the inner ring 23a.

As shown in FIG. 2, the inner ring 23a of the first bearing 23 has a greater diameter than the diameter of the inner ring 24a of the second bearing 24, so that the inner ring 23a of the first bearing 23 is radially spaced from the hub shaft 12. The inner ring 23a of the first bearing 23 is not in direct contact with the hub shaft 12. The outer ring 23b of the first bearing 23 is stably constrained in a seat formed in the hub body 11.

Between the inner ring 23a of the first bearing 23 and the hub shaft 12 a routing opening 25 (better illustrated in FIGS. 3 and 5) crossed by the electrical conductor elements 21 is provided.

The routing opening 25 crosses the hub body 11 in the axial direction, placing the inside of the hub body 11 in communication with the outside of the hub body 11. The routing opening 25 has a limited extension in the circumferential direction, in other words it has a circumferential extension of less than 360°. In the preferred embodiment of the invention, the extension in the circumferential direction of the routing opening is comprised between 10° and 90°, preferably between 25° and 60°, for example about 30°.

The routing opening 25 extends, in the radial direction, between the hub shaft 12 and a support body 26. The support body 26 is arranged radially inside the first bearing 23 and has the function of abutting in the radial direction against the first bearing 23 at least in the portion engaged by the routing opening 25. As illustrated in FIGS. 3 and 5, the inner ring 23a of the first bearing 23 is in direct contact with the support body 26 allowing the first bearing 23 to discharge radial forces onto the support body 26. The routing opening 25 is delimited in the radially outer direction by a delimiting wall 27 of the support body 26.

In the preferred embodiment of the invention, the support body 26 is active on the inner ring 23a of the first bearing 23 for the entire circumferential extension thereof and has a radially outer resting surface 26a that is contacted by the inner ring 23a of the first bearing 23. The radially outer surface 26a of the support body 26 is a substantially cylindrical continuous surface matched to the inner ring 23a of the first bearing 23.

Figure 3A:
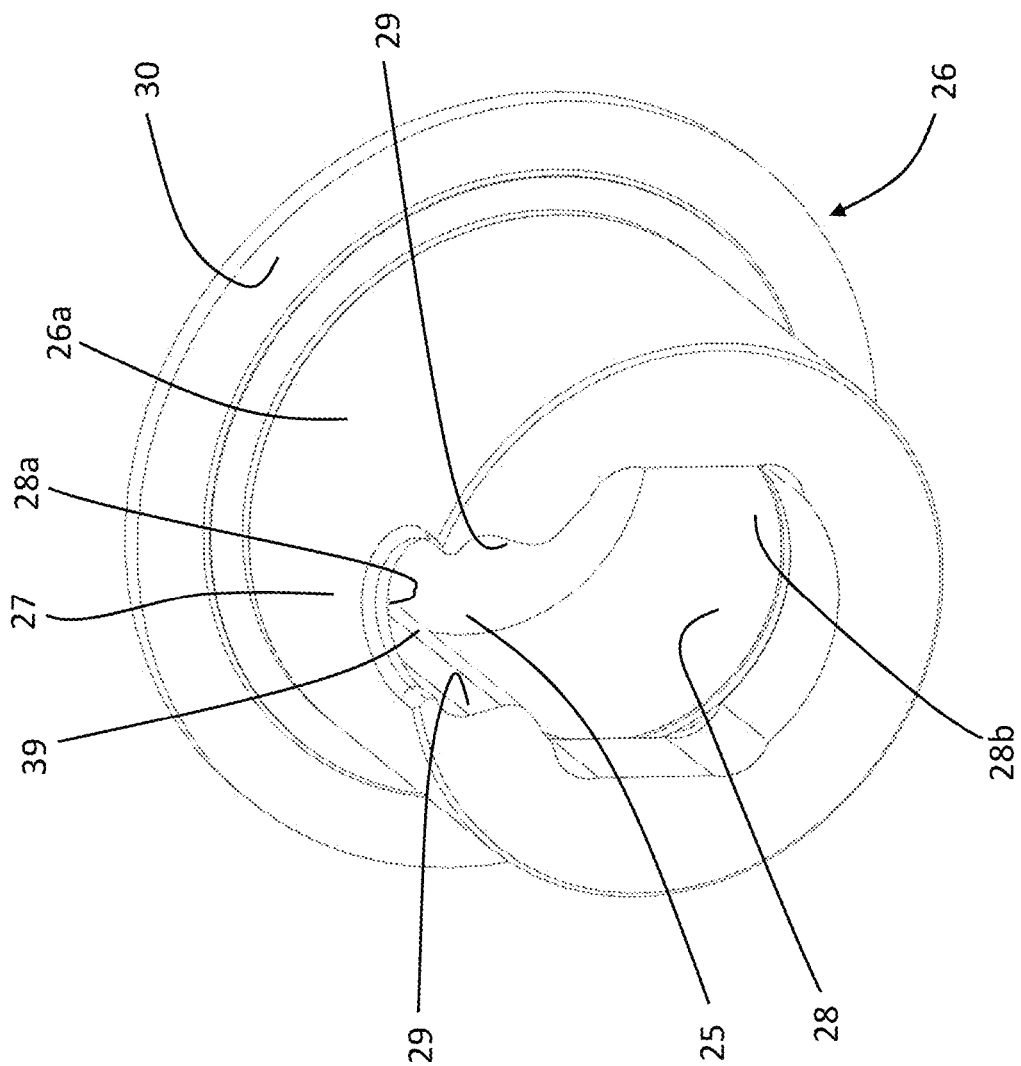
FIG. 3A is a perspective view of an element of the hub assembly of FIG. 1.

In a first embodiment of the support body 26, illustrated in FIGS. 1, 2 and 3, the support body 26 comprises a radially inner surface 28 (FIGS. 3 and 3A) having a first portion 28a and a second portion 28b. The first portion 28a coincides with a radially inner surface of the delimiting wall 27. Such a first portion 28a directly faces the routing opening 25 and has a circumferential extension equal to the circumferential extension of the routing opening 25. The second portion 28b of the radially inner surface 28 of the support body 26 is in direct contact with the hub shaft 12, in particular with the outer surface 12d of the hub shaft 12. The support body 26 is directly mounted on the hub shaft 12 with possible mechanical interference. The support body 26 is directly in contact with the hub shaft 12 for part of the circumferential extension of the hub shaft 12 excluding the part of the hub shaft 12 engaged by the routing opening 25. In order to avoid the support body 26 being able to rotate with respect to the hub shaft 12, the hub shaft 12 and the support body 26 are coupled together through a shape coupling. Such a shape coupling can comprise a substantially flat portion of the radially inner surface 28 of the support body 26 countershaped to a flat portion 12e (partially visible in FIG. 1) of the outer surface 12d of the hub shaft 12.

The radially inner surface 28 of the support body 26 comprises two joining portions 29 (illustrated in FIG. 3A) that join the first portion 28a and the second portion 28b of the radially inner surface 28. The two joining portions 29 make two steps, which are configured like two side walls, which circumferentially delimit the routing opening 25. The support body 26 is macroscopically configured like an annular body that has a groove defining the routing opening 25.

The support body 26 also has, at the radially outer support surface 26a, a shoulder 30 facing axially towards the hub body 11. The shoulder 30 has an annular shape and axially abuts the first bearing 23 directly contacting the inner ring 23a of the first bearing 23, as better illustrated in FIG. 3.

In a second embodiment of the support body 26, illustrated in FIGS. 4 and 5, the support body 26 comprises a substantially cylindrical radially inner surface 31 radially spaced from the hub shaft 12. The radially inner surface of the delimiting wall 27 is comprised in the radially inner surface 31. The radially inner surface 31 is not in contact, at any point, with the hub shaft 12 but is in contact with a spacer body 32 through a coupling surface 33. As schematically illustrated in FIG. 5, the coupling surface 33 comprises a threading 34 and the spacer body 32 comprises a threading 35 arranged on a radially outer surface thereof 32b. The threadings, 34, and 35, of the coupling surface and of the spacer body 32 are configured to couple so as to be able to screw the support body 26 on the spacer body 32. In order to make it possible to easily screw the support body 26 on the spacer body 32, the support body 26 comprises an axially outer portion 26b equipped with walls counter-shaped to a mounting tool.

As shown in FIG. 5, the spacer body 32 is directly mounted on the hub shaft 12 so that it cannot rotate with respect to the hub shaft 12. To this purpose, the hub shaft 12 and the spacer body 32 are coupled together through a shape coupling. Such a shape coupling can comprise a radially inner surface 32a of the spacer body 32 having a substantially flat portion matched to a flat portion 12e (FIG. 4) of the outer surface 12d of the hub shaft 12.

As shown in FIG. 4, the spacer body 32 comprises a first circumferential end wall 36 and a second circumferential end wall 37 that define the circumferential limits of the routing opening 25. At the routing opening 25 the spacer body 32 is not in contact with the hub shaft 12.

The spacer body 32 is made from the stator 19 or from a stator portion 19 of the electric motor 18, which thus projects axially outside of the hub body 11.

In both embodiments of the support body 26, the hub assembly 10 comprises an annular sealing gasket 38 axially outside the first bearing 23. The annular sealing gasket 38 can be an oil seal, a dust guard or an oil seal that integrates a dust guard and has the function of preventing the entry of foreign bodies, water, mud or dirt in the first bearing 23. The annular sealing gasket 38 is arranged radially between the hub body 11 and the support body 26 and is preferably in axial contact with the outer ring 23b of the first bearing 23.

The support body 26 also comprises a radial passage 39 axially outside the first bearing 23 that has the function of allowing the electrical conductor elements 21 to exit the hub assembly 10 in the radial direction. The radial passage 39 is made from a hole or a through opening in the delimiting wall 27 of the support body 26 formed in axially outer position to the axial position occupied by the first bearing 23. In the attached figures, the radial passage 39 is illustrated in the first embodiment of the support body 26, however it could also be provided in relation to the second embodiment of the support body 26.

At the radial passage 39 a buffer 40 is provided (FIGS. 2 and 3) arranged radially outside the radial passage 39 at the delimiting wall 27. The buffer 40 is arranged axially outside the first bearing 23 and comprises a radial hole that allows the passage of the electrical conductor elements 21. The buffer 40 prevents foreign bodies, water, mud or dirt from being able to enter into the radial passage 39, therefore acting as sealing gasket. In the attached figures, the buffer 40 is illustrated in the first embodiment of the support body 26, however it could also be provided in relation to the second embodiment of the support body 26.

The hub assembly 10 also comprises a cover 41 mounted at an axial end of the hub shaft 12. The cover 41 axially delimits the routing opening 25, as shown in FIG. 3. The cover 41 comprises an axial through hole 42 coaxial with the longitudinal through cavity 12a of the hub shaft 12. The axial hole 42 is configured to receive the quick release axle and allow the mounting of the hub assembly 10 on the fork or on the chain stay of the bicycle. The cover 41 is made fixed with respect to the hub shaft 12 through a grub screw 43 that radially crosses the cover 41 and that inserts into a blind hole or a groove 44 of the support body 26. The blind hole or the groove 44 is formed on the support body 26 in a position not engaged by the routing opening 25, as illustrated in FIG. 3. The grub screw 43 also makes it possible to mount the cover 41 with an unequivocal orientation with respect to the support body 26 and thus with respect to the hub shaft 12. The cover 41 axially contacts the buffer 40 holding it axially in position. In the attached figures, the cover 41 is illustrated in the first embodiment of the support body 26, however it could also be provided in relation to the second embodiment of the support body 26.

The mounting of the hub assembly 10 provides for mounting the first bearing 23 on the hub body 11 coupling the outer ring 23b stably with the hub body 11.

In the case of the first embodiment of the support body 26, the latter is arranged inside the first bearing 23 with the inner ring 23a in contact on the radially outer resting surface 26a of the support body 26. The shoulder 30 is arranged in axial abutment on the first bearing 23. In the case of the second embodiment of the support body 26, the latter is coupled with the stator 18 of the electric motor 19 (or is part of the same or is the stator 19 itself).

At this point, the electric motor 18 and the control unit 22 are inserted in the hub body 11 through the axial end 11b of the latter equipped with the removable closing plate 14. The electric motor 18 is pre-wired with the electrical conductor elements 21. The electrical conductor elements 21 are made to pass radially inside the first bearing 23.

In the case of the first embodiment of the support body 26, the electrical conductor elements 21 are routed through the routing opening 25 that is partially formed by the support body 26 already arranged in position inside the first bearing 23.

In the case of the second embodiment of the support body 26, the insertion of the electric motor 18 determines the positioning of the spacer body 32 in position radially inside the first bearing 23, at least partially making the routing opening 25. The electrical conductor elements 21 are made to pass through the partially formed routing opening 25.

If the buffer 40 is present, the electrical conductor elements 21 are previously routed therethrough and positioned axially outside the first bearing 23 through the radial passage 39.

Once the electric motor 18 and the control unit 22 have been inserted in the hub body 11, the hub shaft 12 is inserted inside the hub body 11.

In the case of the first embodiment of the support body 26, the hub shaft 12 is inserted in the support body 26 so that the radially outer surface 12d of the hub shaft 12 contacts the radially inner surface 28 of the support body 26. In this step, the orientation of the hub shaft 12 with respect to the support body 26 is unequivocal through the effect of the shape coupling between the radially inner surface 28 of the support body 26 and the radially outer surface 12*d* of the hub shaft 12. The routing opening 25 is thus completely defined once the hub shaft 12 has been inserted in the hub body 11.

In the case of the second embodiment of the support body 26, the hub shaft 12 is inserted in the support body 26 so that the radially outer surface 12*d* of the hub shaft 12 contacts the radially inner surface 32*a* of the spacer body 32. In this step, the orientation of the hub shaft 12 with respect to the spacer body 32 is unequivocal through the effect of the shape coupling between the radially inner surface 32*a* of the spacer body 32 and the radially outer surface 12*d* of the hub shaft 12.

Once the hub shaft 12 has been positioned, the closing plate 14 is mounted on the open axial end (through which the electric motor 18 and the control unit 22 were inserted) of the hub body 11. The second bearing 24, the inner ring 24*a* of which contacts the radially outer surface 12*d* of the hub shaft 12, was pre-engaged on the closing plate 14.

In the case of the second embodiment of the support body 26, the support body 26 is thus mounted by screwing it on the spacer body 32. Such a coupling takes the radially outer resting surface 26*a* of the support body 26 in contact with the inner ring 23*a* of the first bearing 23.

The assembly of the hub assembly 10 is completed by coupling the cover 41, when provided, with the support body 26.

Of course, those skilled in the art can bring numerous modifications and variants to the hub assembly of the present invention, in order to satisfy specific and contingent requirements, all of which are in any case contained in the scope of protection defined by the following claims.

What is claimed is:

1. A motorized hub assembly for a bicycle wheel comprising:
   a hub shaft extending along a longitudinal axis and comprising a longitudinal through cavity configured to receive a quick release axle;
   at least one first bearing having a radially inner ring and arranged radially outside the hub shaft;
   a hub body radially external to the hub shaft and mounted rotatably, about a rotation axis, on the hub shaft through said first bearing;
   an electric motor arranged inside the hub body;
   a routing opening configured for the passage of electrical conductor elements connected to said electric motor, said routing opening being arranged radially between the inner ring of the first bearing and the hub shaft; and
   a support body provided at least at the routing opening and radially interposed between the inner ring of the first bearing and the routing opening; said support body configured to withstand a thrust directed in a radially inner direction exerted by the first bearing and said inner ring of the first bearing resting on said support body,
   wherein said support body has a delimiting wall for said routing opening; said routing opening being radially defined between said delimiting wall and said hub shaft.

2. The motorized hub assembly according to claim 1, wherein said support body extends circumferentially around the entire hub shaft, with said inner ring of the first bearing resting on said support body along the entire circumferential extension of the support body.

3. The motorized hub assembly according to claim 1, wherein said support body provides a continuous radially outer support surface for said inner ring of the first bearing.

4. The motorized hub assembly according to claim 2, further comprising an annular sealing gasket axially outside the first bearing said sealing gasket resting on said support body and being active between said support body and said hub body.

5. The motorized hub assembly according to claim 1, wherein said support body comprises a radial passage axially outside of said first bearing and defining a radial outlet for said routing opening and passage of said electrical conductor elements.

6. The motorized hub assembly according to claim 5, comprising a cover arranged at an axial end of the hub shaft; said cover axially closing said routing opening and being fixedly connected to said hub shaft.

7. The motorized hub assembly according to claim 1, wherein said support body comprises a radially inner surface comprising a first portion and a second portion; said first portion being radially spaced from said hub shaft and defining a radially inner surface of said delimiting wall and said second portion being directly coupled with the hub shaft.

8. The motorized hub assembly according to claim 7, wherein said radially inner surface of the support body comprises two circumferentially spaced joining portions arranged between the first portion and the second portion, said routing opening being circumferentially delimited by said two joining portions.

9. The motorized hub assembly according to claim 1, wherein said support body comprises a substantially cylindrical radially inner surface spaced from said hub shaft and comprising a radially inner surface of the delimiting wall; said radially inner surface further comprising a coupling surface of the support body arranged in contact with a spacer fixedly connected to the hub shaft.

10. The motorized hub assembly according to claim 9, wherein said spacer comprises a circumferential first end wall and a circumferential second end wall and extends around the hub shaft between said circumferential first end wall and said circumferential second end wall; said routing opening being circumferentially delimited by said circumferential first and said circumferential second end wall.

11. The motorized hub assembly according to claim 9, wherein said coupling surface comprises a threading to screw said support body onto a threading of a radially outer surface of said spacer.

12. The motorized hub assembly according to claim 9, wherein said spacer is made from a portion of a stator of said electric moto.

13. The motorized hub assembly according to claim 1, comprising a second bearing having an inner ring, said second bearing being arranged radially outside the hub shaft and rotatably coupling said hub shaft with said hub body and being axially opposite the first bearing, said inner ring of the first bearing having a greater diameter than a diameter of the inner ring of the second bearing.

14. A motorized hub assembly for a bicycle wheel comprising:
   a hub shaft extending along a longitudinal axis and comprising a longitudinal through cavity;
   at least one first bearing having a radially inner ring and arranged radially outside the hub shaft;
   a hub body radially external to the hub shaft and mounted rotatably, about a rotation axis, on the hub shaft through said first bearing;

an electric motor arranged inside the hub body;

a routing opening configured for the passage of electrical conductor elements connected to said electric motor, said routing opening being arranged radially between the inner ring of the first bearing and the hub shaft; and a support body provided at least at the routing opening and radially interposed between the inner ring of the first bearing and the routing opening; said support body configured to withstand a thrust directed in a radially inner direction exerted by the first bearing and said inner ring of the first bearing resting on said support body, wherein said support body comprises a radial passage axially outside of said first bearing and defining a radial outlet for said routing opening and passage of said electrical conductor elements.

15. The motorized hub assembly according to claim 14, comprising a cover arranged at an axial end of the hub shaft; said cover axially closing said routing opening and being fixedly connected to said hub shaft.

* * * * *